Patented July 17, 1951

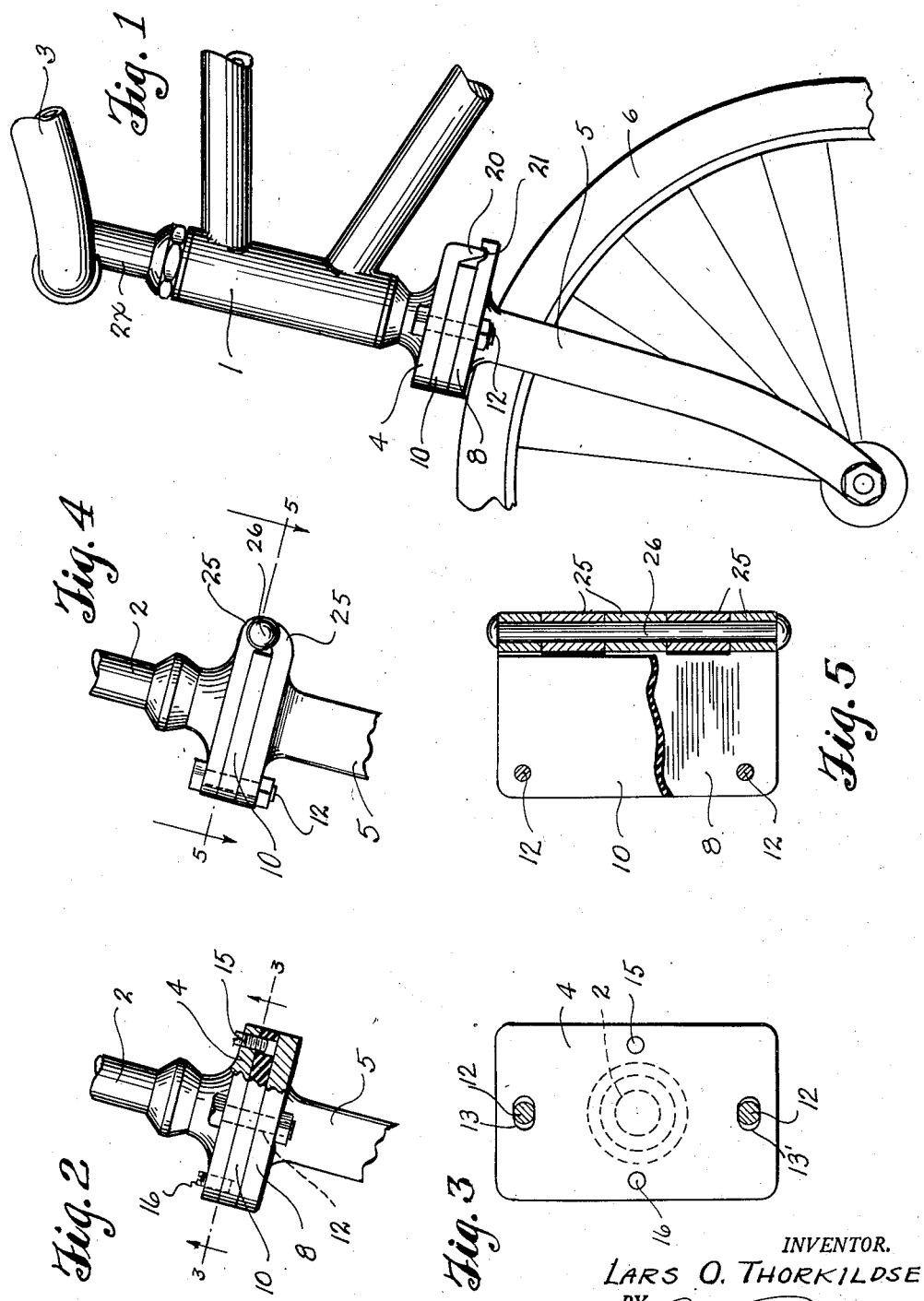

2,561,156

UNITED STATES PATENT OFFICE 2,561,156

BICYCLE FORK

Lars O. Thorkildsen, Sandness, Norway

Application July 22, 1947, Serial No. 762,567
In Norway January 11, 1946

1 Claim. (Cl. 280—276)

This invention relates to improvements in bicycles and the like, and it has reference more particularly to improvements in the construction of the front wheel mounting fork of a bicycle; it being the principal object of the invention to provide a resilient mounting means for the fork arms that will materially reduce the transmittal of shock, jar and vibration from the wheel that is mounted by the fork arms, to the handle bars and frame and will thus make riding more enjoyable and less tiring to the rider, especially if traveling on rough or irregular roadways.

It is also an object of the invention to provide a cushioned, resilient mounting for the front wheel fork arms that is safe, secure and long wearing and wherein normal road vibration is absorbed and shock reduced without any detriment to control or steering of the bicycle.

Another object of the invention is to provide means in connection with the resilient mounting for the fork arms that will, at all times, hold the fork secure and in proper alignment with the steering post to which it is attached.

Still another object of my invention is to provide means for adjusting the tension of the cushioning element as applied to the mounting, to make it more or less resilient.

Still further objects of the invention will be found in the details of construction and combination of parts in their various forms as hereinafter will be fully described.

In accomplishing these and other objects of the invention, I have provided the improved details of construction, the preferred forms of which are illustrated in the accompanying drawings, wherein—

Fig. 1 is a view in side elevation of a portion of a bicycle showing a front fork construction embodying a resilient cushion element embodied by and applied in accordance with the present invention.

Fig. 2 is a detail showing in side elevation, and partly in section, a modification of the construction in which set screws or dowels are employed to limit the movement of the fork arms as permitted by the cushioning member.

Fig. 3 is a section taken on the line 3—3 in Fig. 2.

Fig. 4 is a side view of still another alternative form of mounting for the fork arms, and Fig. 5 is a section of the same taken on the line 5—5 in Fig. 4.

Referring more in detail to the drawings—

Reference numeral 1 designates the usual tubular front end bearing that is formed as a part of, and is rigidly associated with the bicycle frame and in which bearing the upper end member, or steering post portion 2 of the fork construction is rotatably contained. Adjustably fixed in the steering post, and extending from its upper end, is an extension post 2X, which mounts the handle bars 3 in the usual manner for the steering of the bicycle. The post 2 is freely rotatable in its bearing 1 and may be held therein by the usual or other suitable means against endwise movement.

Fixed rigidly to the lower end of the post 2 is a cross head 4 which is in the nature of a rectangular flange as seen in Fig. 3, having a flat under surface lying in a plane perpendicular to the axis of the post. The cross head extends substantially to opposite sides of the post, as shown best in Fig. 3.

The fork structure also comprises the two paired opposite side arms 5—5 between which the bicycle wheel 6 is mounted. The fork is mounted in the usual forwardly and downwardly inclined position and the arms 5—5 are curved forwardly at their lower ends. At their upper ends, the arms 5—5 are joined rigidly by a cross head 8 which is formed with a flat top surface and corresponds in dimensions to the upper cross head 4.

The upper and lower parts of the fork construction are functionally assembled by first applying a cushioning element 10 such as a block, or layer, of rubber, or the like, between the adjacent flat surfaces of the cross heads 4 and 8, and then joining the cross heads, as shown in Figs. 1 and 2, by a pair of bolts 12—12 that are extended through the corresponding end portions of the cross heads and also through the interposed block of rubber, or other cushioning material used. To receive these bolts, the cross heads are each provided, at opposite sides of the fork, with openings therethrough as shown at 13 and 13' in Fig. 3. The openings of the cross head 4 are somewhat elongated, in a forward and rearward direction, so as to permit of a certain forward and rearward movement of the bolt as contained therein incident to the flexing action of the rubber block 10. The block 10 also has holes properly located to receive the bolts therethrough.

The bolts which are used for this purpose preferably are formed with heads at their upper ends to engage the cross head and are threaded to receive nuts at their lower ends. Also, the bolts are shouldered so as to limit the extent to which the nut may be drawn down in the securing of the parts together; the purpose of limiting the extent of tightening of the nuts being to prevent placing too much pressure against the resilient mounting and nullifying its purpose. However, the tension can be adjusted by the adjustment of the nuts.

It will be understood that with the parts assembled as shown in Fig. 1, in riding the bicycle over rough or irregular surfaces, there will be a normal tendency of the fork to move in a forward or rearward plane as permitted by the resiliency of the cushioning element 10 which is interposed between the cross heads 4 and 8. The extent of compression of the rubber pad as controlled by bolts 12—12 will more or less determine the resiliency and this can be regulated as desired by adjusting the nuts on the bolts to more or less compress the cushion.

In a modification, which I have shown in Figs. 2 and 3, the extent of movement of the forks in a forward or rearward direction as permitted by the cushion 10, may be limited by means of the set screws 15 and 16 which are threaded through the forward and rearward edge portions of the upper cross head and holes in the rubber block and by adjustment may be brought closer or farther from the top surface of the under cross head. These set screws or dowels have heads or screw driver slots in their upper ends to provide for adjustment.

In Fig. 1 the upper cross head 4 is shown as being equipped across its back edge portion with a downturned lip 20 adapted to seat pivotally within a transverse groove or channel 21 formed in the top surface of the lower cross head, adjacent its back edge. This retains the fork arms against any turning action relative to the post 2 and permits the desired resiliency through the mediacy of the interposed cushion 10.

In the device of Figs. 4 and 5, the upper cross head and the lower cross head are provided across their rearward edge with hinge ears 25 that receive a pintle 26 whereby they are hingedly joined. The securing bolts 12—12 are applied through the forward corners of the cross heads. The result is substantially that of the device of Fig. 1 in that a desirable resiliency is provided without impairing rigidity for control and steering.

The main feature of the present invention, in the preferred and also in the modified forms of construction, resides in the provision of resiliency in the fork mounting that eliminates or reduces shock and vibration on the arms of the rider to a maximum extent and without impairing the steering effect or the control that the rider should have over the bicycle through the mediacy of the handle bars and steering post. This, together with provision for varying the degree of resiliency, makes the construction desirable and practical both for children and adults.

Having thus described my invention, what I claim as new therein and desire to secure by Letters Patent, is:

A bicycle fork construction comprising a mounting shaft with a cross-head fixed rigidly thereto and extending to opposite sides thereof at its lower end, a pair of wheel mounting forks with a second cross-head rigidly joining them across their upper ends; said cross-heads, respectively, having flat lower and upper surfaces facing each other, a resilient pad disposed between said surfaces, two bolts extended through said cross-heads, directly at opposite sides of the mounting shaft and securing nuts adjustable therein to determine the extent of compression under which the pad is held between the said cross-heads; said cross-heads having slots therethrough and containing the bolts with clearance for front to rear rocking action, and set screws adjustably mounted in one cross-head at front and rear of the mounting shaft, to limit the extent of forward and rearward rocking movement of the fork mounting cross-head as permitted by said bolts and pad.

LARS O. THORKILDSEN.

REFERENCES CITED

The following references are of record in the file of this patent:

UNITED STATES PATENTS

| Number | Name | Date |
|---|---|---|
| 482,735 | Hanson | Sept. 20, 1892 |

FOREIGN PATENTS

| Number | Country | Date |
|---|---|---|
| 5,623 | Great Britain | Dec. 10, 1898 |
| 158,705 | Great Britain | Feb. 11, 1921 |
| 201,489 | Switzerland | Feb. 16, 1939 |
| 451,803 | France | Feb. 21, 1913 |
| 637,970 | Germany | Nov. 7, 1936 |